Oct. 12, 1965

W. H. McKEE ETAL 3,211,217

FLUID REVERSING VALVE STRUCTURE

Filed July 12, 1963

INVENTOR
Philip G. Hoffman and
Wayne H. McKee
BY
*Frank Cristiano Jr.*

Oct. 12, 1965   W. H. McKEE ETAL   3,211,217
FLUID REVERSING VALVE STRUCTURE
Filed July 12, 1963   2 Sheets-Sheet 2
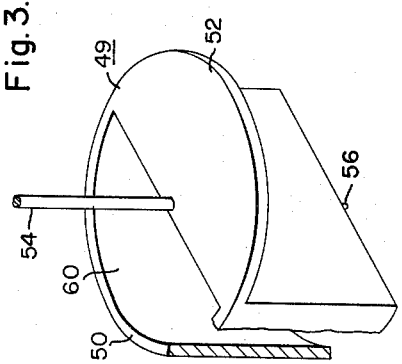
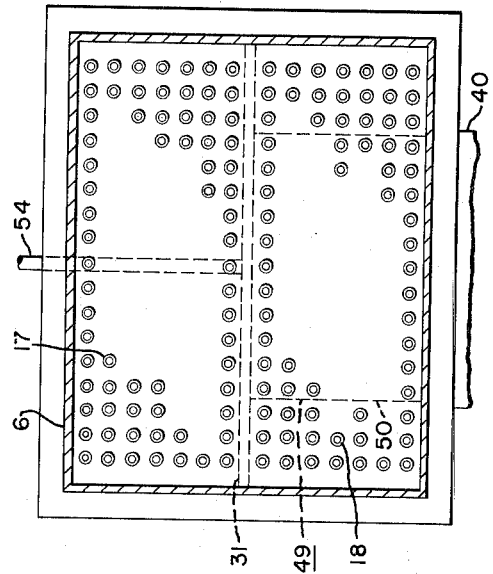
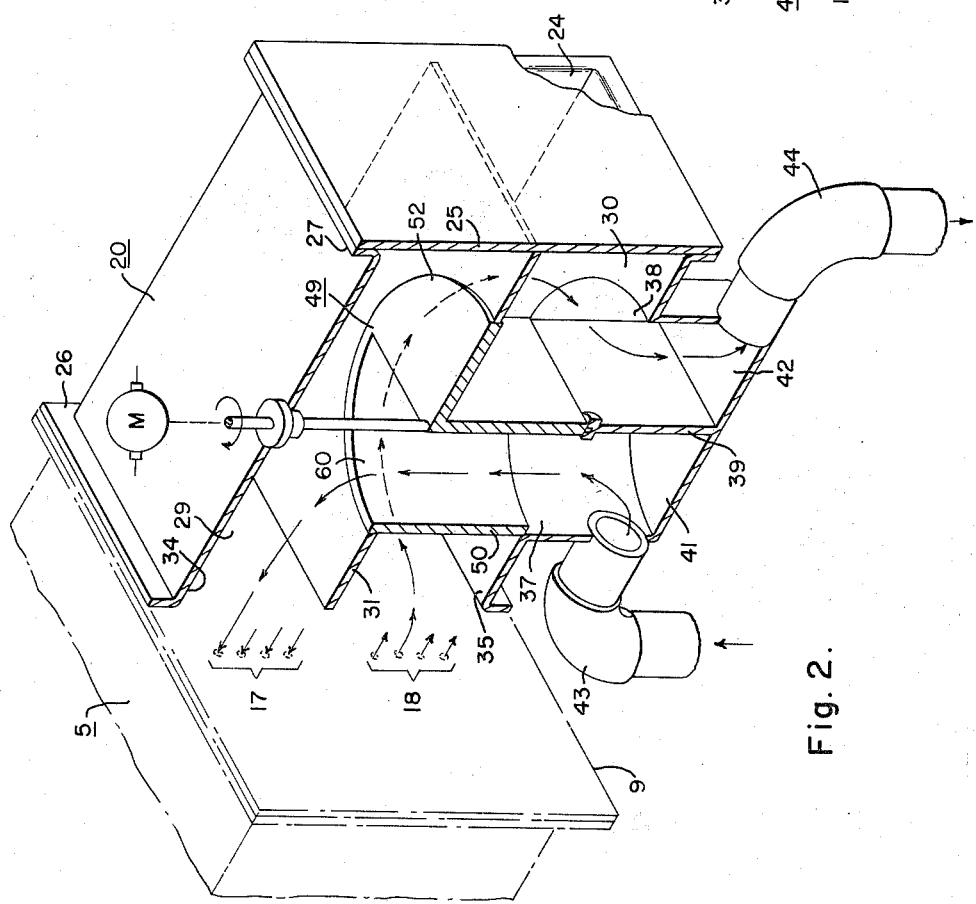

United States Patent Office 3,211,217
Patented Oct. 12, 1965

3,211,217
FLUID REVERSING VALVE STRUCTURE
Wayne H. McKee, Woodbrook, and Philip G. Hoffman, Wallingford, Pa., assignors to Westinghouse Electric Corporation, East Pittsburgh, Pa., a corporation of Pennsylvania
Filed July 12, 1963, Ser. No. 294,714
7 Claims. (Cl. 165—95)

This invention relates to a fluid reversing device, more particularly to a valve for reversing the flow of fluid through a surface heat exchanger, and has for an object to provide improved apparatus of this type.

Fluid reversing devices or valves of the above type are employed for periodically reversing the flow of fluid, such as water, for example, through a heat exchanger, such as a surface condenser, for example, to dislodge and flush debris from the heat exchanger tubes, which debris may otherwise restrict the flow of the fluid through the heat exchanger and impair the efficiency of the apparatus.

Conventionally, these valve devices are attachable to the coolant fluid distribution box of the heat exchanger and are effective to direct the incoming fluid from one distribution chamber to the other during reversal. Such arrangements are unduly complicated, quite costly and require a considerable amount of space, since the apparatus is of relatively large size and the reversing valves may attain a diameter on the order of three to six feet.

In view of the above, it is a further object of the invention to provide a fluid reversing device of the above type that may be incorporated in the fluid distribution box of a surface heat exchanger, so that the valve body serves a dual function.

A more specific object is to provide a fluid reversing device that is simple and compact, easily manufactured and permits economies in materials and manufacturing labor.

Briefly, in accordance with the invention the fluid reversing device comprises a valve housing having first and second ports and divided into first and second chambers by an internal partition. The first chamber is in always open communication with the first port and, in a similar manner, the second chamber is in always open communication with the second port. The housing is further provided with a fluid inlet port and a fluid outlet port disposed adjacent each other and in spaced relation with a central aperture in the partition. A movable valve member is rotatably received within said housing and is provided with an axially extending tubular portion extending from the aperture to the inlet and outlet ports and a radially extending planar portion disposed in flow restricting relation with the aperture and disposed in radially opposed relation with the tube portion. The tubular portion is of sufficient cross-sectional area to fully encompass the inlet port when disposed in registry therewith, and the outlet port when in registry therewith, while the planar portion is effective to block flow between the two chambers.

In operation, the valve member is rotatable from a first position in which the tubular portion connects the inlet port to the first chamber and the outlet port is disposed in communication with the second chamber, to a second position in which the tubular portion connects the outlet port to the first chamber and the inlet port is disposed in communication with the second chamber, thereby to jointly reverse the direction of incoming and outgoing fluid through the two chambers.

The valve housing may be directly connected to the tube sheet of a multi-pass tube and shell type surface heat exchanger in such a manner that the "always open" first port is disposed in communication with one-half of the tube end openings in the tube sheet, while the second port is disposed in communication with the other half of the tube end openings. Hence, as the fluid flow through the two chambers is reversed, the flow of fluid through the fluid passes is reversed.

These and other objects are effected by the invention as will be apparent from the following description and claims, taken in connection with the accompanying drawings, forming a part of this application, in which:

FIG. 2 is a sectional isometric view showing the fluid reversing device in the other operating position;

FIG. 3 is an isometric view of the movable valve member employed in the fluid reversing device; and FIG. 4 is a transverse sectional view taken on line IV—IV of FIG. 1.

Figure 1:
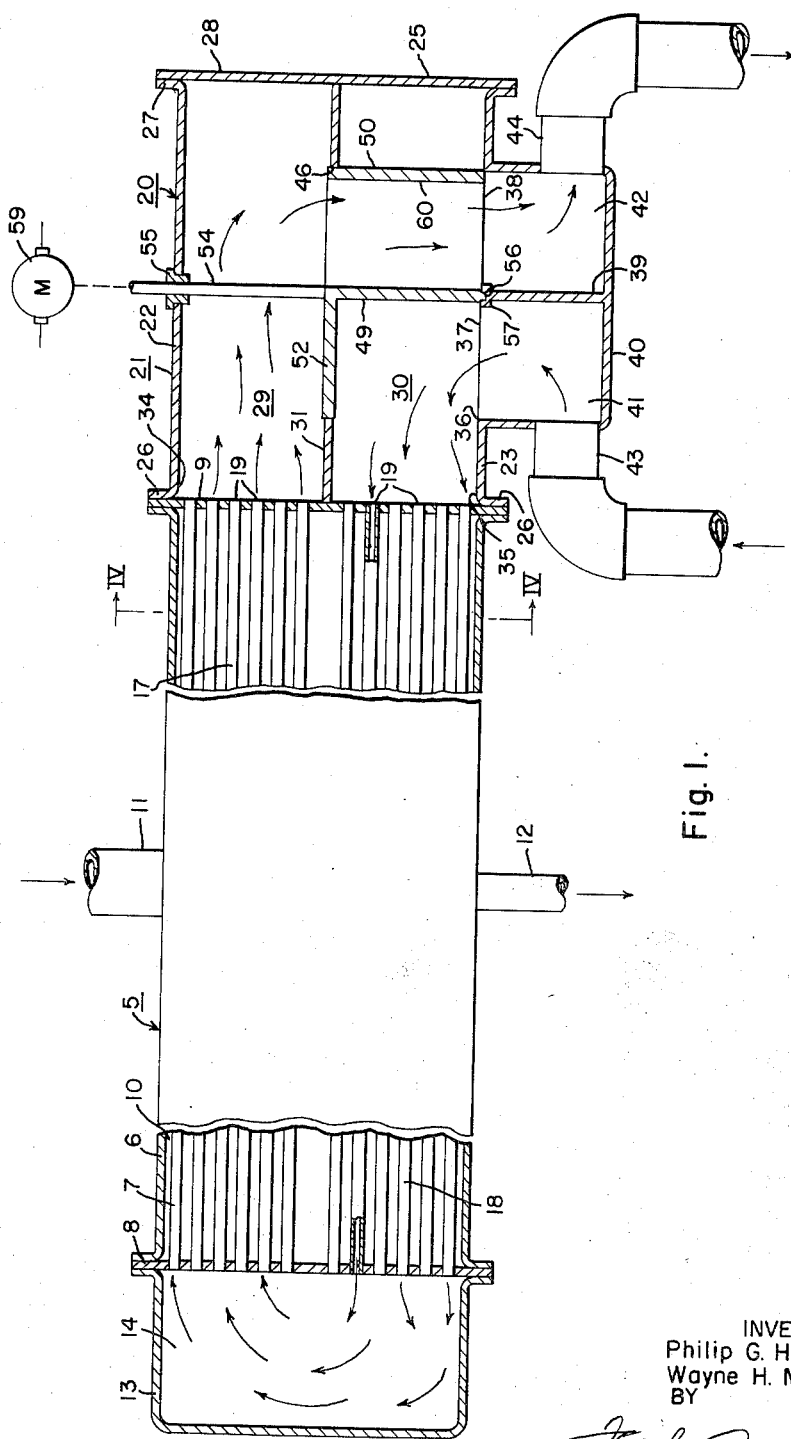
FIGURE 1 is a longitudinal sectional view of a surface heat exchanger having a fluid reversing device formed in accordance with the invention, the fluid reversing device being shown in one operative position.

Referring to the drawings in detail, in FIG. 1 there is illustrated a surface heat exchanger 5 of the tube and shell type including a tubular outer shell 6 flanged at opposite ends and having disposed therein a plurality of heat exchanging tubes 7 connected at their opposite ends to a pair of tube sheets 8 and 9, respectively. The two tube sheets 8 and 9 together with the outer shell 6 defined a space 10 to which a fluid may be directed through an inlet conduit 11 and exhausted therefrom, after undergoing heat exchange, through a conduit 12. A suitably flanged end shell structure 13 is further provided and disposed in encompassing abutting relation with the tube sheet 8 to jointly therewith form a fluid reversing box or space 14. Further, the tubes 7 are arranged to provide multiple fluid passes, for example, a fluid pass 17 disposed in the upper portion of the shell structure 6 and a fluid pass 18 disposed in the lower portion of the shell structure 6.

Accordingly, as thus far described, it will be understood that when a fluid is admitted through the tube end openings 19 in the lower portion of the tube sheet 9 to the first or lower pass 18, the fluid traverses these tubes and is directed into the reversing box 14 and thence is directed in the opposite direction through the second or upper pass 17 and is exhausted through the tube openings 19 in the upper portion of the tube sheet 9. Concomitantly therewith, as a second fluid is admitted into the space 10 through the inlet conduit 11 and flows around the tubes in the upper and lower passes 17 and 18, heat exchange between the fluid flowing in the tubes and the fluid flowing through the space 10 is obtained so that the fluid discharged through the conduit 12 is modified, that is, heated or condensed as desired.

For example, if the heat exchanger 5 is employed as a vapor condenser, the fluid admitted into the space 10 is the hot vaporous fluid, while the fluid flowing through the upper and lower tube passes 17 and 18 is a coolant fluid such as a liquid. Accordingly, during the resulting heat exchange within the space 10, the vapor admitted thereto is condensed and is withdrawn through the outlet 12 as a liquid.

As well known in the art, with vapor condensers such as steam condensers employed in conjunction with steam power plants, the fluid employed is usually water from natural sources such as the sea, lakes, rivers, etc. Such water usually contains a relatively large amount of foreign matter occurring therein in natural form and, during operation, the water flowing through the upper pass 17 and the lower pass 18 has the effect of accumulating debris in the tubes and in the region of the tube sheets 8 and 9 so that, as the debris accumulates, the flow of the liquid through the tubes becomes impeded and the efficiency of the heat exchanger is lowered.

In accordance with the invention, there is provided a device 20 for periodically reversing the flow of the fluid through the upper and lower passes 17 and 18, respectively. The fluid reversing device 20 comprises a housing 21 which may be of substantially the same cross-sectional area as that of the heat exchanger shell 6. For example, as illustrated, it may be in the form of a parallelepiped to suit the rectangular cross-sectional shape of the heat exchanger shell 6. The housing 21 is provided with upper and lower walls 22 and 23, side walls 24 (only one shown) and an end wall plate 25. The upper, lower and side walls may be suitably flanged at both ends as indicated at 26 and 27 to permit fastening the housing 21 in encompassing relation to the tube sheet 9 to jointly therewith and together with the end wall 25 of the housing form a valve body and fluid distribution box generally indicated at 28.

The valve body and distribution box 28 is divided into an upper chamber 29 and a lower chamber 30 by a main centrally disposed partition 31 extending from the end wall 25 to the plane of the flange structure 26, thereby to further define an upper end port 34 disposed in "always open" communication with the chamber 29 and a lower end port 35 disposed in "always open" communication with the lower chamber 30. The ports 34 and 35, in the embodiment shown, are of rectangular shape and disposed in adjacent vertically spaced coplanar relation with each other so that te ports 34 and 35 are also in always open communication with the tubes in the upper pass 17 and the lower pass 18, respectively.

The lower wall 23 is disposed in a plane normal to the ports 34 and 35 and is provided with a large central opening 36 divided into an inlet port 37 and an outlet port 38 by a downwardly extending partition 39. The downwardly extending partition 39, together with a depending subhousing 40 of any suitable shape, for example cylindrical, forms an inlet space 41 and an outlet space 42. The inlet space 41 is connectible to a suitable supply of fluid (not shown) by a conduit 43, while the outlet space 42 is connectible to a suitable drain for the outgoing fluid by a suitable conduit 44.

The partition 31 is provided with a central opening 46 disposed in registry with the opening 36 and, in the embodiment shown, the openings 36 and 46 are of substantially similar circular shape with their central axes disposed in alignment with each other. Accordingly, the partition 39 serves to impart a semicircular shape to the inlet and the outlet ports 37 and 38.

The fluid reversing device 20 is further provided with a rotatable valve member 49 having an axially extending semicylindrical tubular portion 50 having one end slidably received in the opening 46 and its opposite end disposed in sealing relation with the marginal surfaces of the lower wall 23 defining the opening 36 so that, in the position shown in FIG. 1, the outlet port 38 is disposed in communication with the upper chamber 29. The movable valve member 49 is further provided with a planar portion 52 received in the opening 46 and radially opposed to the tubular portion 50. The planar portion 52, in the embodiment shown, is of semicircular disk shape and serves to restrict or block the passage between the lower chamber 30 and the upper chamber 29. Accordingly, with the valve in the position shown in FIG. 1, the inlet port 37 is disposed in communication with the lower chamber 30.

The valve member 49 is provided with an axially extending shaft 54 which may be extended through the upper wall 22 of the housing and rotatably supported therein by a suitable bearing 55, while the lower portion of the valve member 49 may be provided with a pivot 56 suitably supported for rotation by a bearing 57 provided in the partition 39. The valve member 49 may be rotated about the axis of the shaft 54 in any suitable manner, for example, manually or by a suitable electric motor 59 of any geared-down type so that rotation is attained at a slow rate.

Referring to FIGS. 1, 2 and 4, it will be seen that the cross-sectional area of the tubular portion 50 is of considerably smaller extent than that of the lower chamber 30 so that fluid in the chamber 30 may flow about the tubular portion 50 freely and without restriction.

In operation, when the fluid reversing device 20 is in the position shown in FIG. 1, the incoming fluid is directed by the conduit 43 into the inlet space 41 and through the inlet port 37 to the lower chamber 30. From the chamber 30 the fluid is directed through the tubes in the lower pass 18 to the reversing box 14 and then reversed in direction and directed through the upper tube pass 17 into the upper chamber 29. From the upper chamber 29 the fluid is directed through the passageway 60 formed in the tubular valve portion 50 through the outlet port 38 and the outlet space 42 to the drain conduit 44.

To reverse the flow of fluid through the heat exchanger 5, the valve member 49 is rotated through a central angle of 180° from the position shown in FIG. 1 to the position shown in FIG. 2. With the valve member 49 in this position, the tubular portion 50 is effective to provide a communication between the inlet port 37 and the upper chamber 29 and the outlet port 38 is placed in communication with the lower chamber 30. The incoming fluid is directed through the passageway 60 in the tubular portion 50 from the inlet port 37 to the upper chamber 29 and thence through the upper tube pass 17 to the reversing box 14 (see FIG. 1) where it is reversed and is directed through the lower tube pass 18 to the lower chamber 30. From the lower chamber 30, the fluid flows around the external periphery of the tubular portion 50 through the outlet port 38 and thence to the outlet conduit 44 to drain. Hence, with the valve in this position, the direction of fluid through the heat exchanger is effectively reversed so that if, during operation of the heat exchanger with the reversing device in the position shown in FIG. 1, debris should collect in the lower portion of the tube sheet 9 and in the tube openings disposed therein, when the fluid flow through the exchanger is reversed by positioning the valve as shown in FIG. 2, the fluid exiting from the lower tube pass 18 through the openings 19 in the lower portion of the tube sheet 9 will tend to dislodge the collected debris and entrain it with the fluid being directed through the outlet port 38 to the drain conduit 44.

As well known in the heat exchange art, surface heat exchangers of the type shown and described in conjunction with this invention usually employ a separate fluid distribution box (not shown) for directing the fluid through the upper and lower passes 17 and 18 and fluid reversing devices have heretofore been attached to the heat exchanger distribution box. However, as it is now apparent, the housing 21 of the fluid reversing device is effective to form the fluid distribution box for the heat exchanger 10, thereby eliminating the separate distribution box heretofore required.

The fluid reversing device 20 provides a well-balanced arrangement in which the forces of the fluid acting on the rotatable valve member 49 are substantially balanced. More specifically, the fluid pressure in the lower chamber 30 is substantially the same as the fluid pressure in the upper chamber 29 so that the effective force on the semicircular disk member 52 is substantially minimized. Similarly, the pressure of the fluid flowing through the passage 60 in the tubular valve portion 50 is substantially the same as that of the fluid flowing through the lower chamber 30 so that the stress on the tubular portion 50 is substantially minimized. Of course, it will be understood that, although the forces have been mentioned above as being substantially the same, there is a differential in pressure which is equal to the pressure drop of the fluid obtained during traversal of the upper and lower tube passes 17 and 18 in the heat exchanger. However, the pressure drop in the tubes is usually maintained at a relatively small value to permit effective operation of the heat exchanger.

The fluid reversing device may be readily serviced, if and when desired, by removing the end plate 25 and thereby rendering the upper and lower chambers 29 and 30 accessible to a repairman. Also, if desired, the rotatable valve member 49 may be axially translated in upward direction to permit greater accessibility to the lower chamber, when required.

Since the sliding seal surfaces between the semicircular member 52 and the partition 31 are of relatively small area and since the sliding seal surfaces between the tubular member 50 and the partition 31 and the lower wall 23 are of relatively small surface area, the frictional resistance of the rotatable valve member 49 during operation is held at a low value, so that the valve member may be easily rotated from one position to the other position.

While the invention has been shown in but one form, it will be obvious to those skilled in the art that it is not so limited, but is susceptible of various changes and modifications without departing from the spirit thereof.

We claim as our invention:

1. In combination,
a multipass tube and shell heat exchanger comprising,
tube structure including a plurality of tubes providing first and second fluid passes,
a tube sheet to which said tubes are connected at least at one end,
means at the opposite end connecting the tubes of said first pass to the tubes of said second pass,
a housing connected to said tube sheet,
means dividing said housing into first and second chambers,
said first chamber being in always open communication with said first fluid pass and said second chamber being in always open communication with said second fluid pass,
said housing having a fluid inlet port and a fluid outlet port,
said means including valve means disposed within said housing for selectively controlling the direction of fluid flow through said first and second passes,
said valve means having a first position in which said inlet port is disposed in communication with said first chamber and said outlet port is disposed in communication with said second chamber, and a second position in which said inlet port is disposed in communication with said second chamber and said outlet port is disposed in communication with said first chamber, and
means for moving said valve means from said first position to said second position, thereby to reverse the flow of fluid through said first and second fluid passes.

2. In combination,
a multipass tube and shell heat exchanger comprising,
tube structure including a plurality of tubes providing first and second heat exchanging fluid passes,
a tube sheet to which said tubes are connected at least at one end,
means at the opposite end connecting the tubes of said first pass to the tubes of said second pass,
a housing connected to said tube sheet and jointly therewith forming a fluid distribution box,
means dividing said housing into first and second chambers,
said first chamber being in always open communication with said first fluid pass and said second chamber being in always open communication with said second fluid pass,
said housing having an inlet port and an outlet port disposed in juxtaposed relation with each other,
said means including valve means disposed within said housing for selectively controlling the direction of fluid flow through said first and second passes,
said valve means having a first position in which said inlet port is disposed in communication with said first chamber and said outlet port is disposed in communication with said second chamber, and to a second position in which said inlet port is disposed in communication with said second chamber and said outlet port is disposed in communication with said first chamber,
said first and second positions being disposed at a central angle of about 180° with each other, and
means for moving said valve means from said first position to said second position, thereby to reverse the flow of fluid through said first and second fluid passes.

3. In combination,
a multipass tube and shell vapor condenser comprising,
tube structure including a plurality of tubes providing first and second coolant fluid passes,
a tube sheet to which said tubes are connected at least at one end,
means at the opposite end connecting the tubes of said first pass to the tubes of said second pass,
a housing connected to said tube sheet and jointly therewith forming a coolant distribution box,
means within said housing dividing said distribution box into first and second chambers,
said first chamber being in always open communication with said first collant pass and said second chamber being in always open communication with said second coolant pass,
said housing having a coolant inlet port and a coolant outlet port,
said means including valve means disposed in said housing and cooperatively associated with said inlet port and said outlet port,
said valve means having a first position in which said inlet port directs coolant to said first chamber and said second chamber directs coolant to said outlet port, and a second position in which said inlet port directs coolant to said second chamber and said first chamber directs coolant to said outlet port, and
means for moving said valve means from said first position to said second position thereby to reverse the flow of coolant through said first and second coolant passes.

4. In combination,
a multipass tube and shell vapor condenser comprising,
tube structure including a plurality of tubes providing first and second coolant fluid passes,
a tube sheet to which said tubes are connected at least at one end,
means at the opposite end connecting the tubes of said first pass to the tubes of said second pass,
a valve housing connected to said tube sheet and jointly therewith forming a coolant distribution box,
said housing having a main partition dividing said distribution box into first and second chambers,
said first chamber being in always open communication with said first coolant pass and said second chamber being in always open communication with said second coolant pass,
said housing having a coolant inlet port and a coolant outlet port,
said partition having an aperture,
valve means disposed within said housing and extending from said aperture to said inlet port and said outlet port, said valve means being cooperatively associated with said inlet port and said outlet port and having a first position in which said inlet port communicates with and directs coolant to said first chamber and said second chamber communicates with and directs coolant to said outlet port, and a second position in which said inlet port communicates with and directs coolant to said second chamber and said first chamber communicates with and directs coolant to said outlet port, said inlet port and said outlet port being disposed at a central angle with each other of about 180°, and means for rotating said valve means from said first position to said second position, thereby to jointly reverse the flow of coolant through said first and second coolant passes.

5. A fluid reversing device comprising, a housing, a main partition dividing said housing into first and second chambers, said partition having an aperture provided therein, said housing having a fluid inlet port, a fluid outlet port, and a pair of end ports, said end ports being disposed in always open fluid flow communication with said first and second chambers, said inlet port and said outlet port being disposed in juxtaposed relation and in substantially coaxial alignment with said aperture, and a valve member disposed within said housing and rotatably supported thereby, said valve member having an imperforate planar portion disposed in flow restricting relation with said aperture and a tubular portion disposed in radially opposed relation with said planar portion and extending from said aperture to said inlet and outlet ports, said valve member being rotatable from a first position in which said inlet port is disposed in communication with said first chamber and said outlet port is disposed in communication with said second chamber, to a second position in which said inlet port is disposed in communication with said second chamber and said outlet port is disposed in communication with said first chamber, thereby to jointly reverse the direction of fluid flow through said first chamber and said second chamber.

6. A fluid reversing device comprising, a housing, a main partition dividing said housing into first and second chambers, said partition having a circular aperture provided therein, said housing having an inlet port, an outlet port, and a pair of end ports, said end ports being disposed in always open fluid flow communication with said first and second chambers, said inlet port and said outlet port being each of substantially equal semi-circular cross-sectional area and jointly of substantially circular cross-sectional area, and disposed in substantially coaxial alignment with said circular aperture, and a valve member rotatably mounted in said housing, said valve member having a semi-circular disc portion rotatably received in said aperture and a semi-circular tubular portion disposed in diametrically opposed relation with said disc portion and extending from said aperture to said inlet and outlet ports, said valve member being rotatable about a central angle of about 180° from a first position in which said inlet port is disposed in communication with said first chamber and said outlet port is disposed in communication with said second chamber, to a second position in which said inlet port is disposed in communication with said second chamber and said outlet port is disposed in communication with said first chamber, thereby to jointly reverse the direction of fluid flow through said first chamber and said second chamber.

7. The structure recited in claim 6 in which said end ports are arranged in side-by-side relation with each other and disposed in a first common plane, and said inlet and outlet ports are disposed in a second common plane normal to said first plane.

References Cited by the Examiner

UNITED STATES PATENTS

| 779,889 | 1/05 | Todd | 137—625.43 X |
| 821,268 | 5/06 | Walker | 137—625.43 |
| 1,519,205 | 12/24 | Keifer | 137—625.43 X |
| 2,173,492 | 9/39 | Lidiak | 165—97 X |

FOREIGN PATENTS 522,294  3/56  Canada.

ROBERT A. O'LEARY, *Primary Examiner.*

CHARLES SUKALO, *Examiner.*